(12) United States Patent
Jørgensen

(10) Patent No.: US 6,874,752 B2
(45) Date of Patent: Apr. 5, 2005

(54) REGULATION INSERT WITH SEVERAL ADJUSTMENT POSSIBILITIES

(75) Inventor: Ole Jørgensen, Slagelse (DK)

(73) Assignee: Frese Armatur A/S, Slagelse (DK)

( * ) Notice: Subject to any disclaimer, the term of this patent is extended or adjusted under 35 U.S.C. 154(b) by 218 days.

(21) Appl. No.: 10/297,783

(22) PCT Filed: May 31, 2001

(86) PCT No.: PCT/DK01/00378
§ 371 (c)(1),
(2), (4) Date: Mar. 10, 2003

(87) PCT Pub. No.: WO01/94817
PCT Pub. Date: Dec. 13, 2001

(65) Prior Publication Data
US 2003/0168622 A1 Sep. 11, 2003

(51) Int. Cl.$^7$ ................................................ F16K 5/04
(52) U.S. Cl. ....................................... 251/205; 137/504
(58) Field of Search ................................. 251/205, 206; 137/504, 500, 625.3, 625.37, 625.38

(56) References Cited

U.S. PATENT DOCUMENTS

| 48,969 | A | * | 7/1865 | Mills ...................... 137/625.38 |
| 2,079,915 | A | * | 5/1937 | Midyette, Jr. ............... 137/503 |
| 3,131,716 | A | * | 5/1964 | Griswold et al. ............. 137/503 |
| 3,256,905 | A | * | 6/1966 | Griswold et al. ............. 251/205 |
| 3,752,183 | A | * | 8/1973 | Griswold ..................... 137/504 |
| 3,752,184 | A | * | 8/1973 | Griswold ..................... 137/504 |
| 4,109,683 | A | * | 8/1978 | Strache ....................... 251/205 |
| 4,147,177 | A | * | 4/1979 | Iwatsuki ..................... 137/504 |
| 4,527,595 | A | * | 7/1985 | Jorgensen et al. ............ 138/43 |
| 5,054,516 | A | * | 10/1991 | Okerblom ................... 137/504 |
| 5,178,324 | A | | 1/1993 | Moesby |
| 5,265,643 | A | * | 11/1993 | Golestan et al. ............ 137/504 |
| 5,524,670 | A | | 6/1996 | Castle |

FOREIGN PATENT DOCUMENTS

| DK | 171285 B1 | 10/1993 |
| WO | 95/12082 | 5/1995 |

\* cited by examiner

Primary Examiner—Eric Keasel
(74) Attorney, Agent, or Firm—Merchant & Gould P.C.

(57) ABSTRACT

A regulation insert, for insertion in a valve housing in a liquid-carrying medium, having adjustable pre-setting for regulation and/or adjustment of liquid amounts in plants with liquid-carrying media for limiting the medium to a pre-set maximum amount, independently of a difference in pressure working across the valve, the insert having a tubular element which in a housing (3) can be displaced in the longitudinal direction of the regulation insert and lies up against a spring element (8), so that by displacement of the tubular element (2) a number of openings (9) in the housing (3) are opened or closed, and where the pre-setting for the regulation insert has several rows of openings (4, 5, 28), where at least one row of openings (4, 5) is disposed substantially along the circumference of the tubular element (2), and where the rows of openings (4, 5, 28), independently of one another, can wholly or partly block the throughflow in such a manner that a multiple of adjustment possibilities is achieved.

10 Claims, 4 Drawing Sheets

REGULATION INSERT WITH SEVERAL ADJUSTMENT POSSIBILITIES

Figure 3:
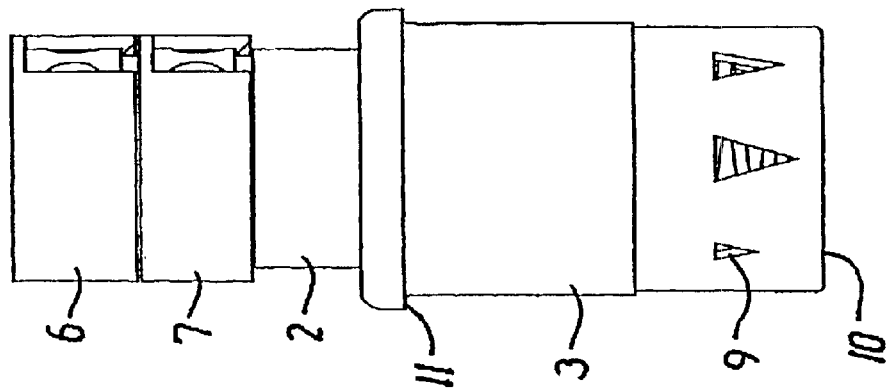

The invention concerns a regulation insert, mainly for insertion in a valve housing or the like in a liquid-carrying medium, comprising adjustable presetting for the regulation and/or adjustment of liquid amounts in plants with liquid-carrying media, for limiting the medium to a pre-set maximum amount, independently of a difference in pressure working across the valve, said insert further comprising a tubular element which in a housing is displaceable in the longitudinal direction of the regulation insert and lies up against a spring element, so that by displacement the tubular element opens or closes a number of openings in the housing.

Regulating valves of various constructions for insertion in valve housings in a liquid-carrying medium for various purposes are already known. For example, such a valve is known from DK patent no. 171285 B1, a so-called flow-valve, intended for insertion in a valve housing in a plant for central heating. This valve, for controlling the flow of liquid in a central heating plant or the like, consists of two concentric elements, circular plates or cylindrical cones. These elements have a number of openings and are arranged to be turned in relation to one another to bring about a restriction point with a fixed opening position, which is selectable from among several opening positions with different areas lying in an equidistant manner along the circumference of the elements, in that the number of openings in the one element is equal to the number of blocked areas in the second element.

In, for example, a central heating plant, which is one of the places where use is made of valves of such a type, valves are provided in different rooms for regulation of the heating, and for that matter this can also involve cooling in connection with air-conditioning. Upon operation of these valves in one or more of the rooms, the pressure conditions in the whole of the plant are changed, and for this reason it is desirable to have a self-regulating valve inserted in the circuit.

In one of the ends, preferably that end which faces towards the flow direction, a pre-setting arrangement is provided for setting the desired nominal flow through the insert, and on the basis of this flow a regulation is made by means of a regulating cone in the form of a tubular element. In order to provide the possibility for fine adjustment of the regulating insert for many different plants and the recommended flow in such plants, it is desirable to have as many adjustment possibilities as possible.

According to the invention, this is achieved by the pre-setting for the regulation insert comprising several rows of openings, where at least one row of openings is placed substantially along the circumference of the tubular element, in that said rows of openings can be completely or partly closed independently of one another for the blocking of the flow through the system. A multiple of adjustment possibilities is hereby achieved.

In that a number of openings of different sizes are formed in the outlet end of the regulation insert, it is possible for the regulation insert to effect a precise regulation over a wide range of differential pressure.

By providing these openings with different sizes, it is achieved that the actual regulation of the flow, independently of the difference in pressure, is given a far more even settling or regulation sequence, since there is a risk that the regulating cone otherwise oscillates forwards and backwards due to the pressure changes which would otherwise arise, in that the regulation cone begins to open or close for these openings.

This oscillation of the regulation cone during regulation can also be damped, in that in an outer area of a cavity which is formed between housing and regulation cone by the changing or steps in diameter of the regulation cone, a ring, disk or the like with a slot-shaped opening is placed along the circumference of the regulation cone. Thereafter, when the regulation cone moves, the volume of the cavity will be increased or reduced, whereby the medium which is either supplied to or removed from the cavity must pass the slot between the regulation cone and the ring, disk or the like, which at the same time serves to hold the regulation cone in place in the regulation insert. By using a disk or the like with other dimensions, the slot is reduced or increased, whereby the damping of the regulation cone is similarly reduced or increased depending on the size of the slot.

The openings which are in the housing, said openings being intended to be opened or closed by the regulation cone, can be configured as round openings of different sizes or as elongated openings, for example formed as slots. These slots can with advantage be configured so that they have decreasing or increasing cross-section seen in the direction of flow. Finally, use can also be made of a distribution of openings with decreasing and increasing cross-section respectively, possibly together with ordinary, longitudinal openings, along the circumference of the housing.

THE DRAWING

Figure 2:
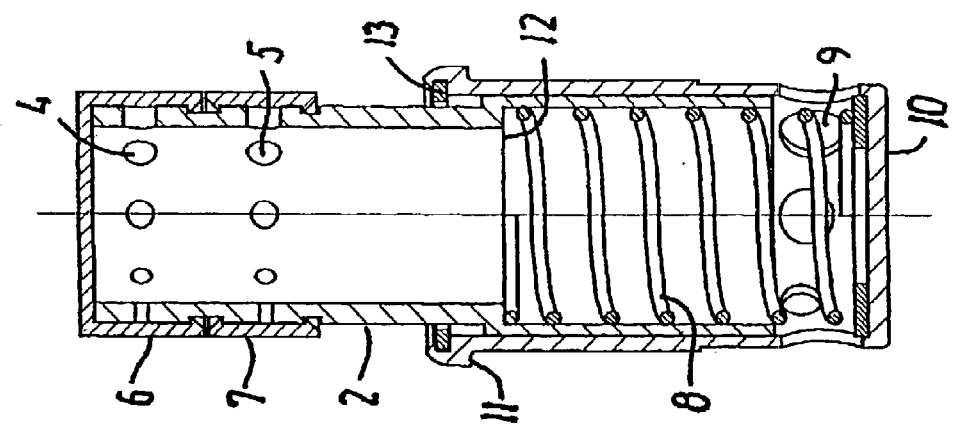
Figure 1:
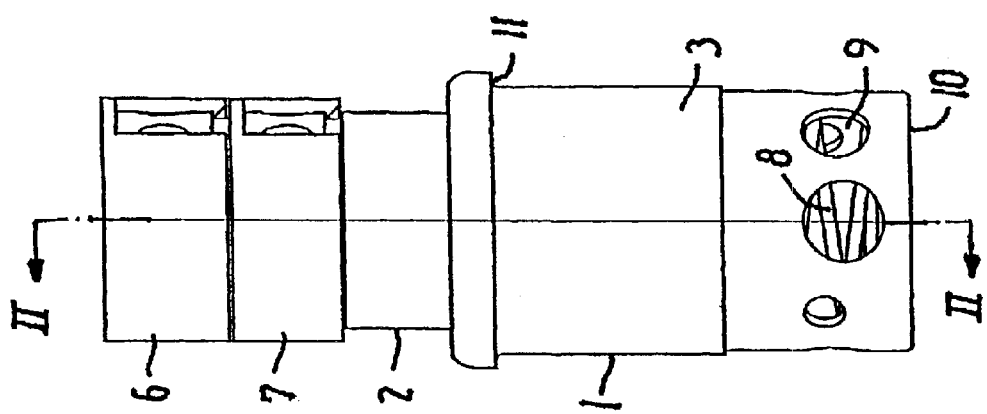
Figure 4:
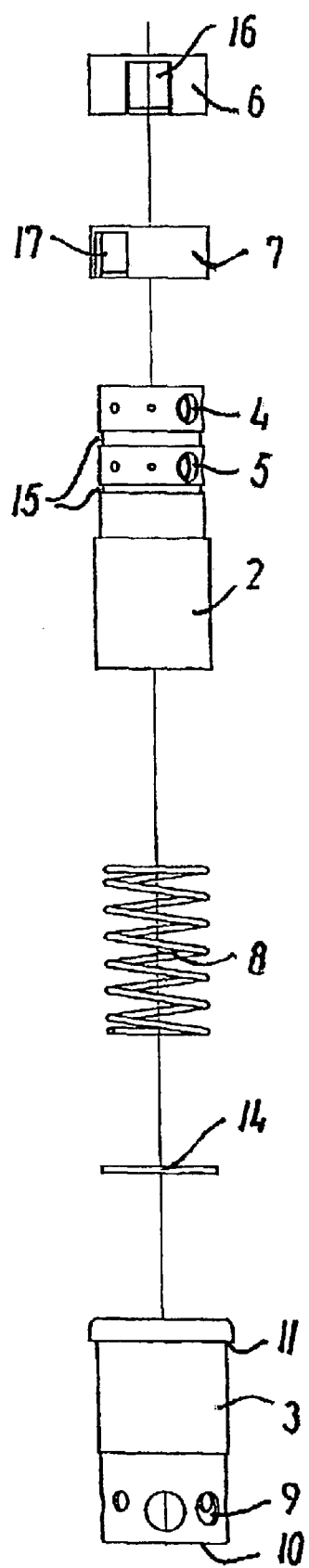
Figure 5:
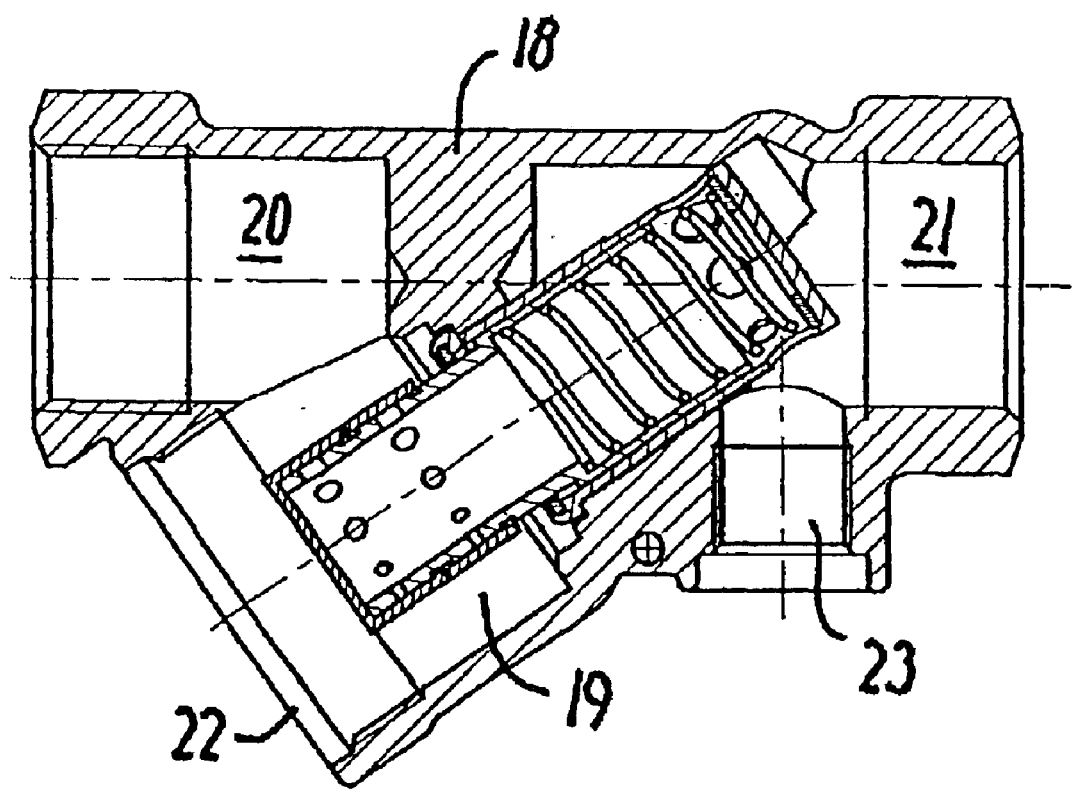
Figure 6:
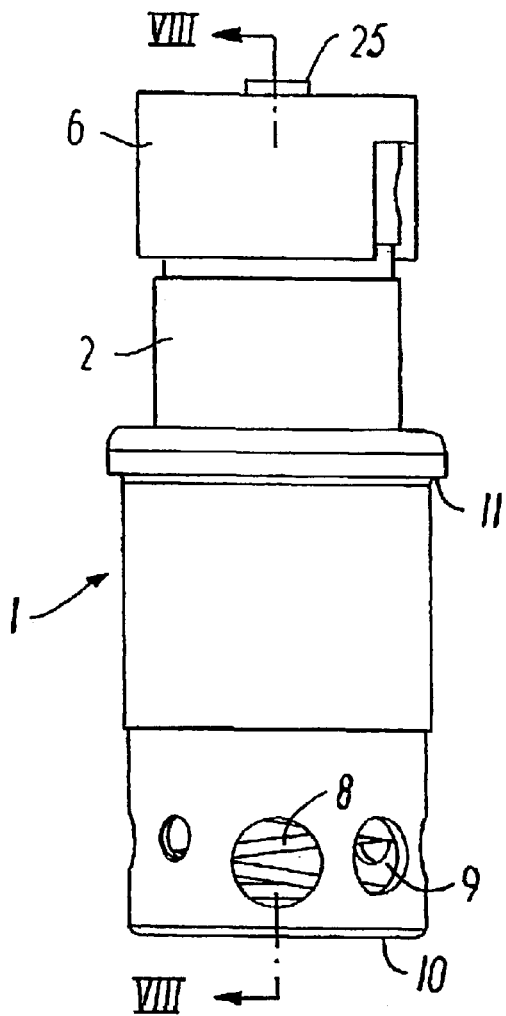
Figure 8:
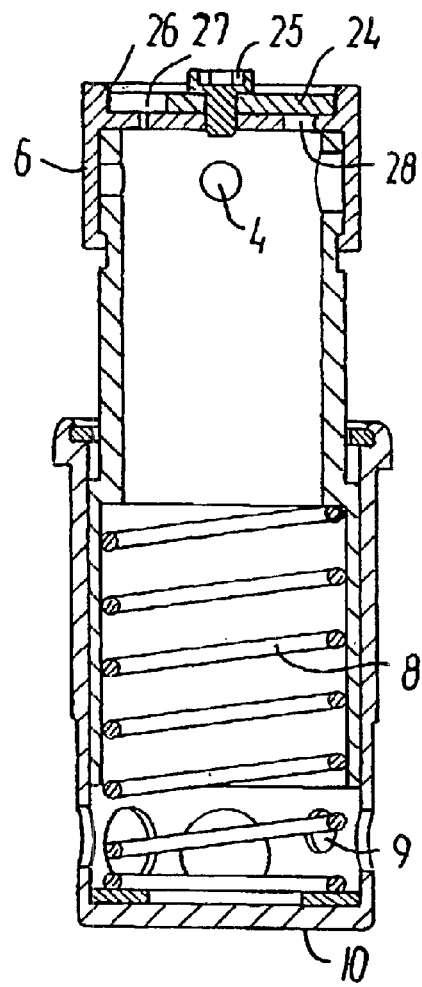
Figure 7:
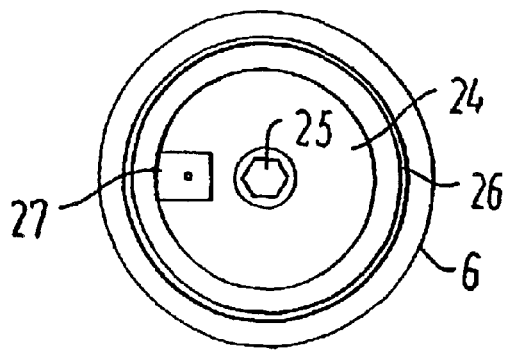

In the following, preferred embodiments of the invention will be described with reference to the drawing, where FIG. 1 shows a regulation insert according to the invention, FIG. 2 shows a regulation insert seen in section II—II, FIG. 3 shows a further embodiment of a regulation insert according to the invention, FIG. 4 shows a regulation insert with main parts separated, FIG. 5 shows a regulation insert mounted in a valve housing, seen in section, FIG. 6 shows a regulation insert with a disk-shaped pre-setting arrangement according to the invention, FIG. 7 shows the regulation insert from FIG. 6 seen from above, and FIG. 8 shows the regulation insert from FIG. 6 seen in section VIII—VIII.

In the following, a preferred embodiment is described of a regulation valve in the form of a regulation insert 1 for insertion in a form of valve housing in a plant with a liquid-carrying medium, where the regulation valve or the regulation insert 1 comprises a regulation cone in the form of a tubular element 2 which is placed in a housing 3 in which it is displaceable. In the end, which faces away from the housing 3, the regulation cone 2 is provided with one or more rows of openings 4, 5 which can be closed completely or partly for blocking the flow through the liquid-carrying medium. The row of openings 4, which is placed outermost in the end, which faces away from the housing 3, is covered completely or partly by a cup-shaped element or cap 6, which cap 6 has an opening 16 in the side. By the turning of the cap around the longitudinal axis of the regulation insert 1, this opening 16 in the side can be placed opposite an opening of a certain size in the row 4 of openings. The regulation insert also comprises one or more annular elements or rings 7, and these rings 7, like the cap 6, are similarly provided with an opening 17 in the side for positioning opposite an opening of a certain size in one or more further rows 5 of openings. In this way, a multiple of precise settings is achieved for adjustments of the flow through the regulation insert, independently of the difference in pressure across the regulation insert. The cap 6 and the ring(s) 7 are, for example, secured to the regulation cone 2 in a manner in which they can be turned, in that one or more beads on the cap (6) and ring(s) 7 secure these by engaging in a number of annual grooves 15 in the regulation cone 2. The main parts forming the regulation insert 1 are seen in FIG. 4.

FIG. 5 shows a valve housing 18, which is intended for building as a unit into the pipeline in a heating plant or cooling plant. The valve housing 18 has an inlet with a cylindrical cavity 20, which, by a channel 19, is connected to an outlet 21, in that an insert or regulation insert 1 is placed in the channel 19. The channel 19 which houses the regulation insert 1 is provided in that end which faces away from inlet 20 and outlet 21 with a form of closure 22, which can be opened for insertion of the regulation insert 1. In the valve housing 18 there can be a further opening 23, which is closed during a working situation.

The flowing medium is led to the valve and into the cylindrical cavity 20, where the medium meets the uppermost part of the assembled insert 1, which comprises an internal, tubular regulation cone or plunger 2 with round cross-section, and an external cup-shaped housing 3.

In a second embodiment of the invention, which is seen in the FIGS. 6–8, the invention can be configured so that the advantage is also achieved that the regulation insert 1 is of a shorter length in the longitudinal direction. This is achieved by letting the one row of holes 4, 5 extend as holes 28 on the upper side or at the end of the cap-shaped pre-setting arrangement 6. By placing a disk 24 with one or more openings 27 at the end of the cap-shaped pre-setting arrangement 6, which disk 24 can be turned around an axis which extends longitudinally through the regulation insert 1, the pre-setting can be set to provide a certain through-flow in the same way as the configuration with an annular pre-setting arrangement 7.

This row of holes 28 can also be placed on the disk 24 with one or more openings 27 placed on the cap-shaped pre-setting arrangement 6.

By turning the disk 24, in/on which the row of holes 28 is placed, in relation to one or more openings 27 in the end part of the cap-shaped pre-setting 6, as in the configuration with a cap-shaped and an annular pre-setting arrangement, a multiple of adjustment possibilities are similarly achieved for the pre-setting of the regulation insert.

In a preferred configuration of this further embodiment of the invention, the disk 24 can be placed at the end and on the surface of the cap-shaped pre-setting 6, or the disk 24 can be placed in a recess 26 formed for this purpose in the end part of the cap-shaped presetting 6, as shown in FIG. 8, so that the disk 24 does not extend longer than the cap-shaped pre-setting 6 in the longitudinal direction of the pre-setting 6. The pre-setting 6 can hereby be turned in relation to the tubular element 2, and the disk 24 can be turned around its centre axis in relation to the pre-setting 6. The pre-setting 6 thus constitutes both the adjustable part of a pre-setting and a through-flow opening, which can be adjusted by means of a further adjustment arrangement in the form of the disk 24. The tubular element 2 can thus be produced with a shorter length, and yet still have an extent which allows sufficient movement of the tubular element 2 in relation to the housing 3, whereby the regulation of the degree to which the openings 9 in the housing 3 are opened can still be effected over the full extent of the openings 9.

The disk 24 is secured at its pivotal point by a pin, screw 25 or a similar means for pivotal securing.

Like the embodiment with a cap-shaped and an annular pre-setting, the disk 24 can possibly be secured in relation to the cap-shaped pre-setting 6, so that it is not possible for unauthorised personnel to change the setting of the pre-setting arrangement.

The regulation insert 1 can also be inserted directly into a straight tube piece, said tube piece being provided internally with an annular projection for abutment of the projecting bead extending along the circumference of the regulation insert 1 with the contact surface 11. In this case the tube piece is of such a dimension that it is possible for the flowing medium to pass between the inner wall of the tube piece and the outer circumference of the regulation insert. A commonly-known form of seal is provided between the annular projection on the tube piece and the contact surface 11 on the regulation insert 1, so that the flowing medium is not allowed passage without passing through the regulation insert 1.

The housing 3 is cup-shaped with the bottom facing away from the pre-setting 6, 7. The housing 3 lies with its circumference tightly up against the outer side of the regulation cone 2, and the regulation cone 2 can be displaced axially inside the housing 3. The housing 3 and the regulation cone 2 coaxially surround a spring element 8, which by contact against the bottom 10 of the housing and against an internal collar-shaped projection 12, which for example is provided in the form of a step in the inside diameter in the regulation cone 2, presses the housing 3 and the regulation cone 2 in opposite directions. A disk 14 can be placed in the bottom of the housing 3 as a contact seating between the spring element 8 and the bottom of the housing 3.

In the open end of the housing 3, a locking ring or disk 13 is provided for securing the regulation cone 2, and for regulation of the extent of the damping of the regulation cone 2 by virtue of the leading-in and out of the liquid-carrying medium from a cavity between the housing 3 and the regulation cone 2 via an annular slot which is formed between the inner circumference of the disk 13 and the outer circumference of the regulation cone 2.

The spring element 8 can be controlled by means of projections, impressions or the like or, as in the simple embodiment, by the inner side of the regulation cone 2, the projection 12 and the bottom 10 of the housing 3.

From FIGS. 1, 2, 3 and 4 it will be understood that a medium from the area immediately in front of the presetting 6, 7 will press against the working area in the housing 3, and through the regulation cone 2 hereby press the spring element together, so that the open edge of the regulation cone 2 will gradually close the outlet openings 9 formed in the housing 3.

It will be understood from the invention that the cap-shaped pre-setting arrangement 6 will be able to function equally as well with an annular pre-setting.

The adjustable pre-setting can be set to provide a certain through-flow opening by the turning of the individual rings 6, 7 around the longitudinal axis of the regulation insert 1, and can possibly be locked fast in its position. For example, it can be configured as follows:

In a preferred embodiment, the openings 4, 5 in the regulation cone 2 can be configured as round openings disposed in an equidistant manner along the circumference in the end of the regulation cone 2, which faces away from the housing 3. The openings 4, 5 can also be disposed along the circumference of the regulation cone 2 so that they extend according to increasing or decreasing size.

The outlet openings 9 in the housing 3 can be configured as round openings disposed in an equidistant manner along the circumference in the one end of the housing. The outlet openings 9 can also be disposed so that they extend along the circumference according to increasing or decreasing size.

In a further embodiment, the outlet openings 9 in the housing 3 can be configured as longitudinally-extending, slot-shaped openings with a cross-section, which decreases in the direction of flow.

Moreover, the outlet openings 9 can have a cross-section which increases seen in the flow direction at the beginning of a regulation movement of the tubular element 2, and a decreasing cross-section seen in the flow direction at the end of the regulation movement of the tubular element 2.

In a not-shown embodiment, uniform outlet openings 9 can be formed in the housing 3, where the edge of the regulation cone 2 can be configured in an irregular manner in order to avoid a too abrupt closing of the cross-section of the outlet openings 9, and herewith avoid a partly unstable course of regulation.

What is claimed is:

1. A regulation insert, for insertion in a valve housing in a liquid-carrying medium, comprising adjustable pre-setting for regulation and/or adjustment of liquid amounts in plants with liquid-carrying media for limiting the medium to a pre-set maximum amount, independently of a difference in pressure working across the valve, said insert comprising a tubular element (2) which, in a housing (3), is displaceable in the longitudinal direction of the regulation insert (1) and lies up against a spring element (8), so that by displacement the tubular element (2) opens or closes a number of openings (9) in the housing (3), characterized in that the pre-setting for the regulation insert comprises several rows of openings (4, 5, 28), where at least one row of openings (4, 5) are disposed substantially along the circumference of the tubular element (2), and where said rows of openings (4, 5, 28), independently of one another, can wholly or partly block the flow.

2. Regulation insert according to claim 1, characterized in that the row of holes (28) placed outermost on the regulation insert (1) are wholly or partly covered by a disk-shaped element (24) which can be turned in relation to the first element (6).

3. Regulation insert according to claim 1, characterized in that the housing (3) is provided with outlet openings (9) of different sizes.

4. Regulation insert according to claim 1, characterized in that the housing (3) is provided with outlet openings (9) with a cross-section which is increasing seen in the flow direction at the beginning of a regulation movement of the tubular element (2), and a decreasing cross-section seen in the flow direction at the end of the regulation movement of the tubular element (2).

5. Regulation insert according to claim 1, characterized in that the outlet openings (9) formed in the housing (3) are round openings and are disposed along the circumference of the one end of the housing (3).

6. Regulation insert according to claim 1, characterized in that the outlet openings (9) formed in the housing (3) are longitudinally-extending, slot-shaped openings with a cross-section which decreases in the flow direction.

7. Regulation insert according to claim 1, characterized in that along the one end of the housing (3) uniform outlet openings (9) are formed along the circumference of the housing (3), and that along its open edge the regulation cone (2) is provided with an irregular-formed edge.

8. Regulation insert according to claim 1, characterized in that the row of holes (4) placed outermost on the regulation insert (1) are wholly or partly covered by a first element (6) which can be turned in relation to and along the circumference of the regulation insert (1).

9. Regulation insert according to claim 8, characterized in that the remaining rows of openings (5) are wholly or partly covered by one or more second annular elements (7) which can be turned in relation to and along the circumference of the regulation insert (1).

10. Regulation insert according to claim 8, characterized in that the turnable element (6,7,24) can be locked in a certain position.

* * * * *

UNITED STATES PATENT AND TRADEMARK OFFICE
CERTIFICATE OF CORRECTION

PATENT NO. : 6,874,752 B2
DATED : April 5, 2005
INVENTOR(S) : Jørgensen

It is certified that error appears in the above-identified patent and that said Letters Patent is hereby corrected as shown below:

<u>Title page,</u>
Item [73], Assignee, replace with -- Frese A/S, Slagelse (DK) --.

Signed and Sealed this

Twenty-ninth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,874,752 B2  
DATED : April 5, 2005  
INVENTOR(S) : Jorgensen

It is certified that error appears in the above-identified patent and that said Letters Patent is hereby corrected as shown below:

<u>Title page,</u>
Insert Item -- [30]   Foreign Application Priority Data
       Jun. 7, 2000     (DK)    PA 2000 00882 --.

Signed and Sealed this

Twenty-fifth Day of April, 2006

JON W. DUDAS
*Director of the United States Patent and Trademark Office*